April 18, 1939.                     C. R. DOWNS ET AL                         2,154,671
                      METHOD FOR FORMING LUMPS OF CALCIUM CHLORIDE
                              Filed Oct. 12, 1935            5 Sheets-Sheet 1

INVENTORS
Charles R. Downs
Joseph W. Spiselman
BY
Hammond Littell
ATTORNEYS

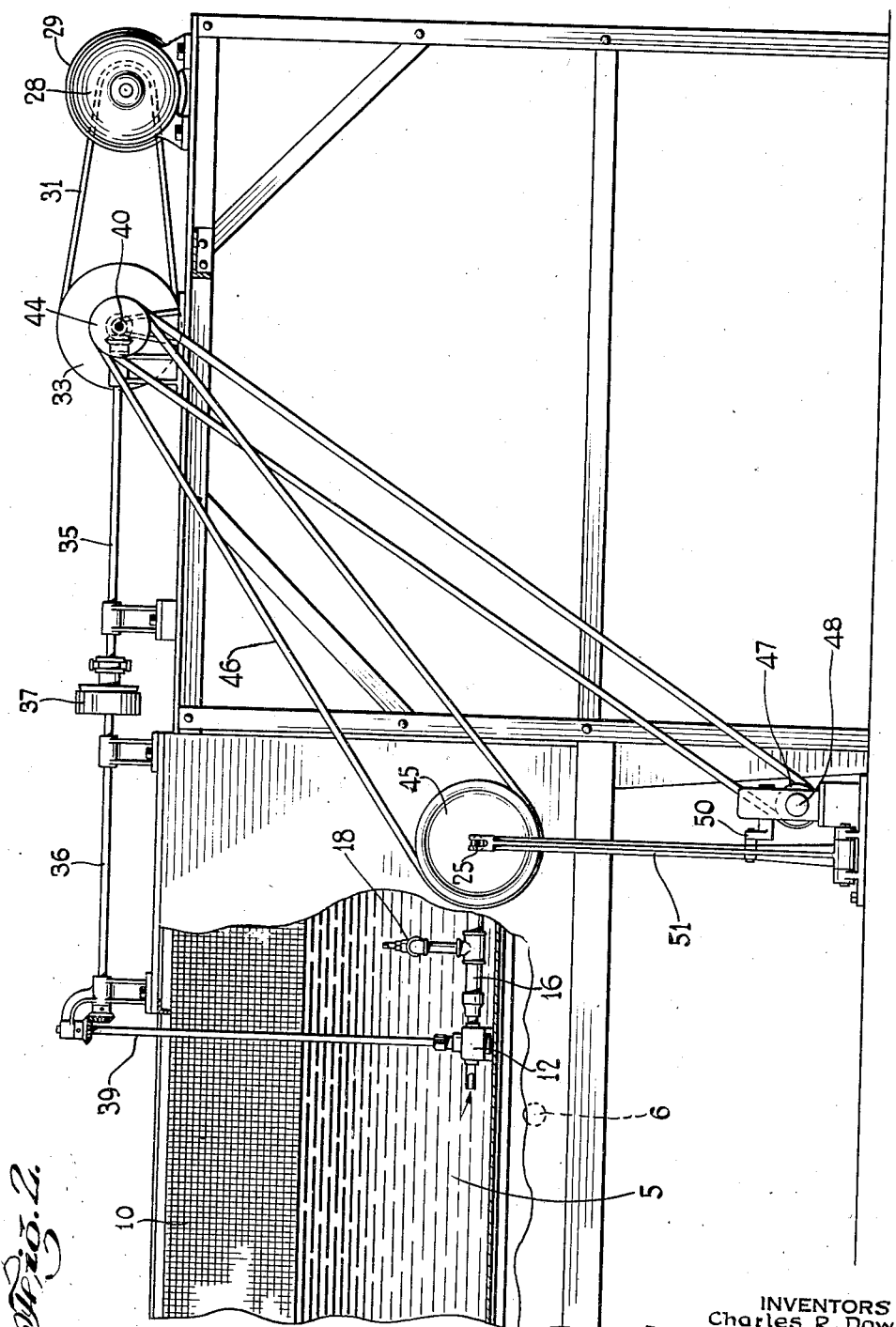

April 18, 1939. C. R. DOWNS ET AL 2,154,671
METHOD FOR FORMING LUMPS OF CALCIUM CHLORIDE
Filed Oct. 12, 1935 5 Sheets-Sheet 3
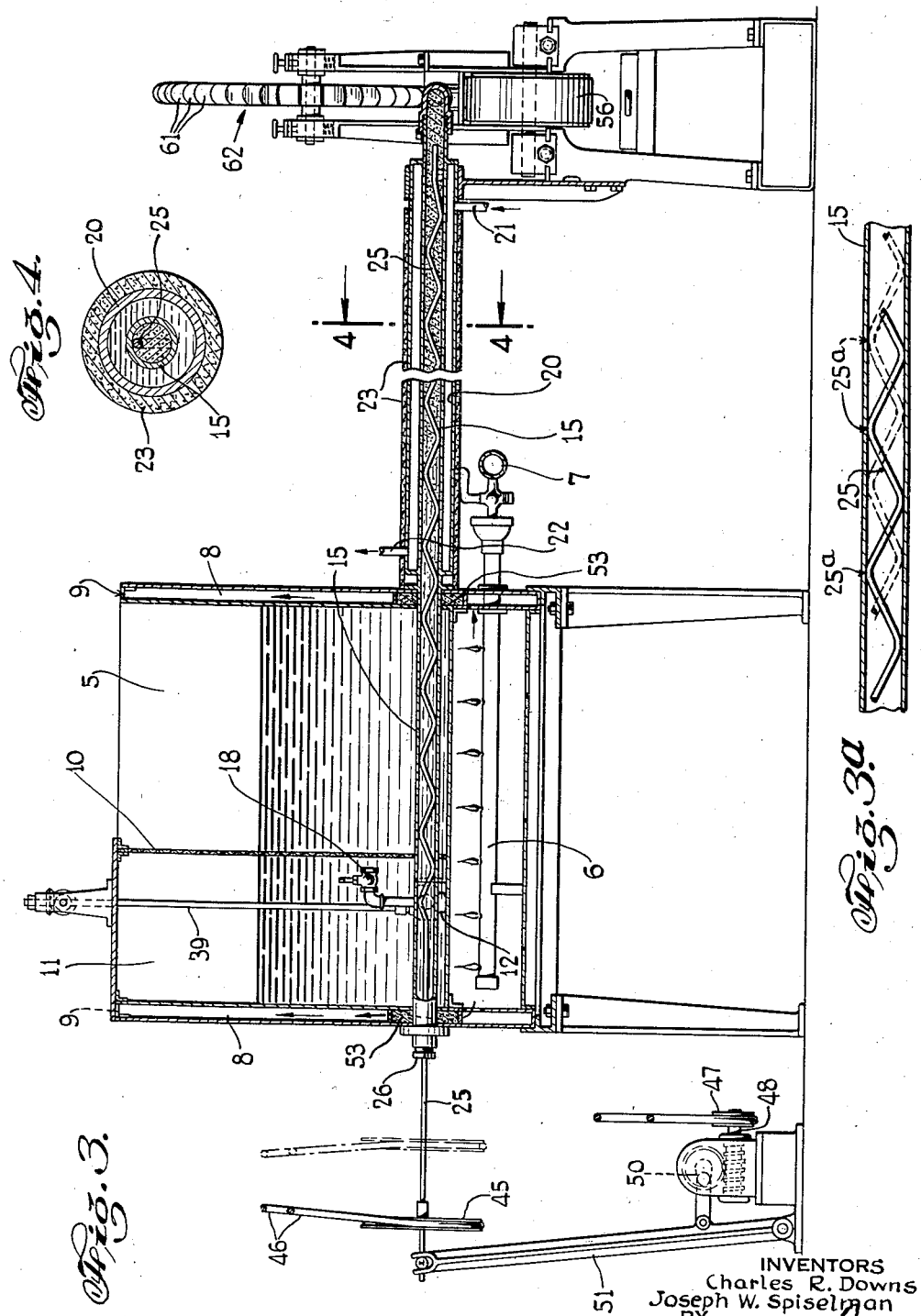

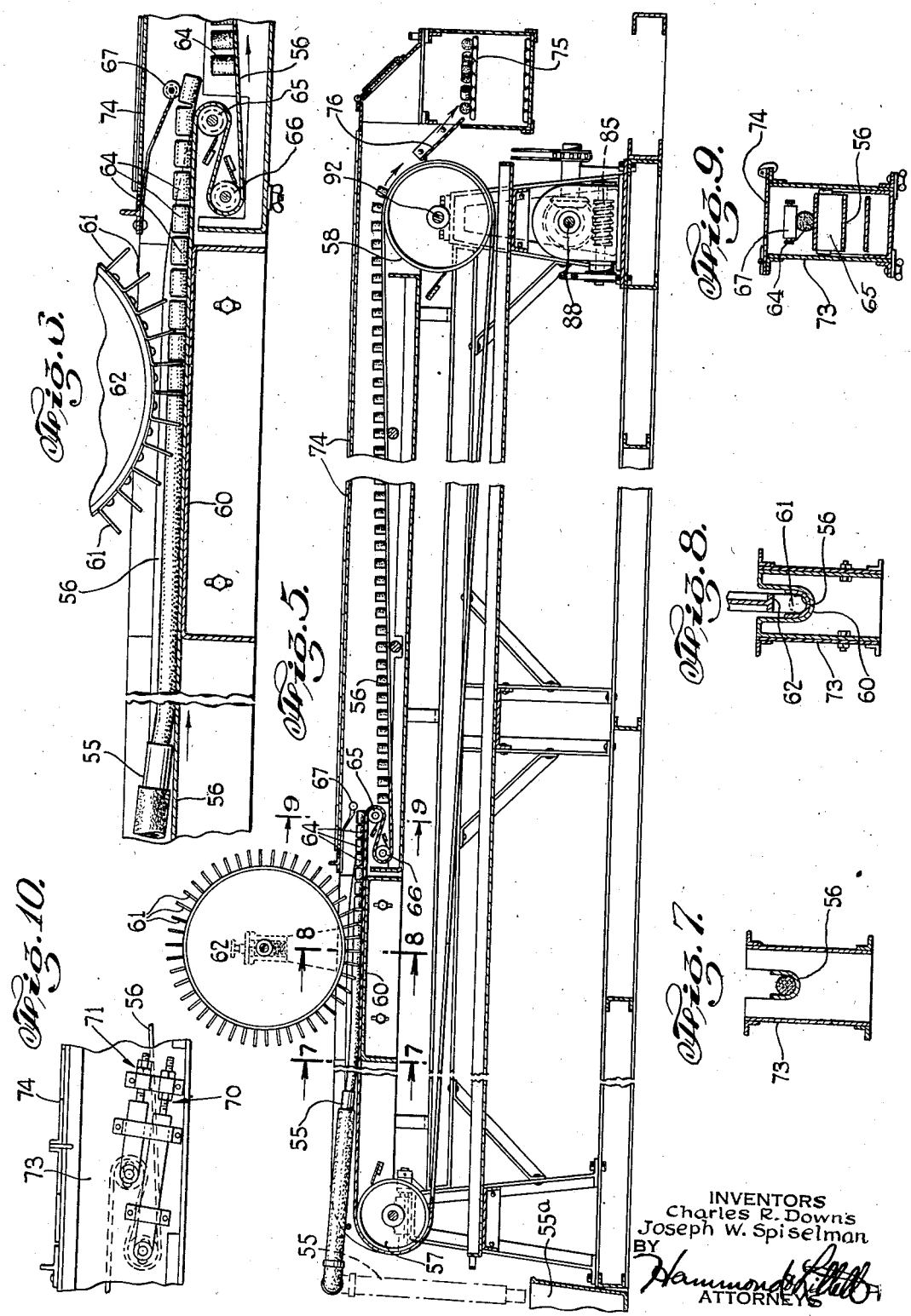

April 18, 1939.　　　C. R. DOWNS ET AL　　　2,154,671
METHOD FOR FORMING LUMPS OF CALCIUM CHLORIDE
Filed Oct. 12, 1935　　　5 Sheets-Sheet 5
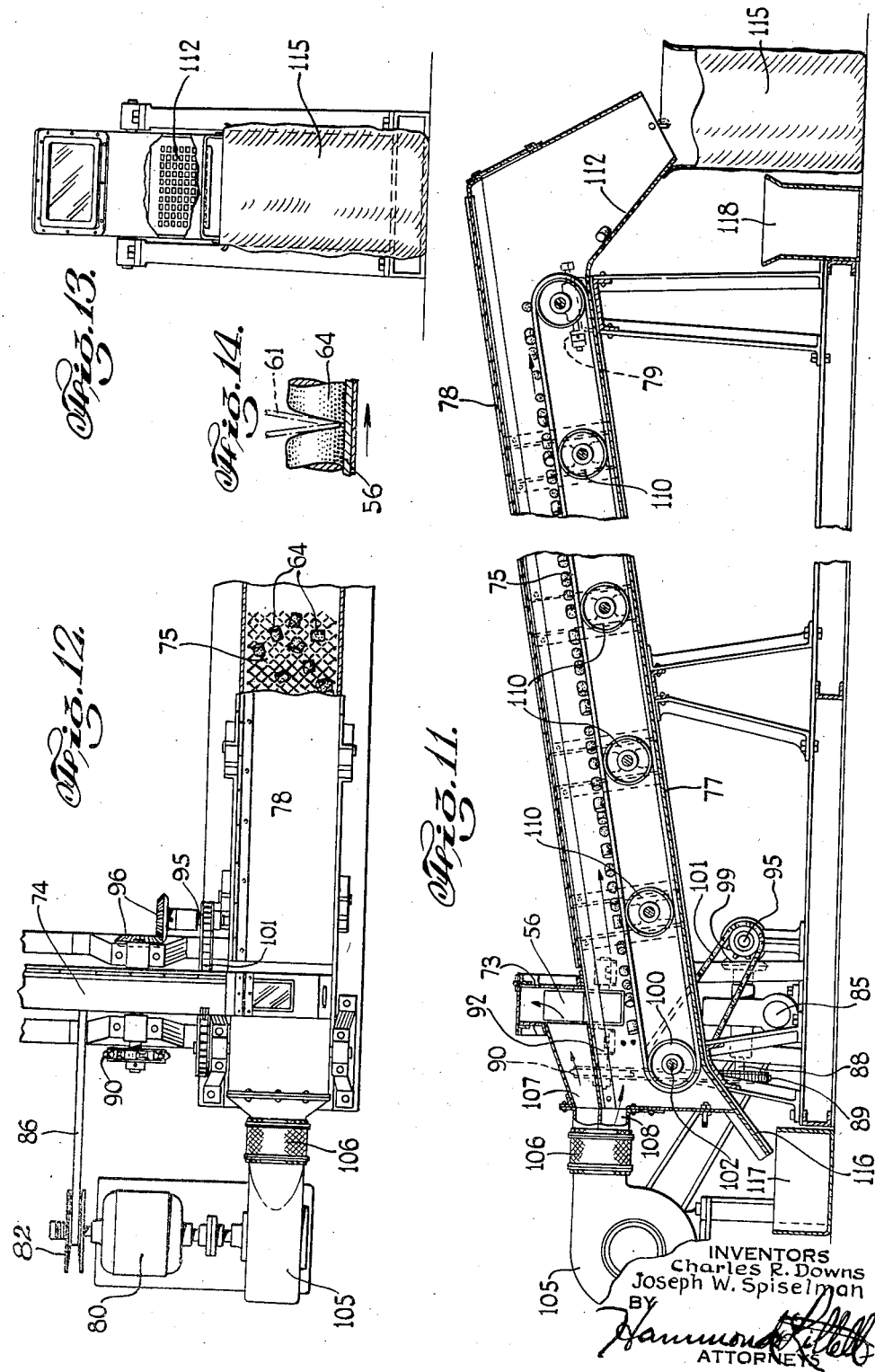

Patented Apr. 18, 1939

2,154,671

UNITED STATES PATENT OFFICE

2,154,671

METHOD FOR FORMING LUMPS OF CALCIUM CHLORIDE

Charles R. Downs, Old Greenwich, Conn., and Joseph W. Spiselman, Brooklyn, N. Y., assignors to Calorider Corporation, Greenwich, Conn., a corporation of Connecticut Application October 12, 1935, Serial No. 44,700

8 Claims. (Cl. 23—90)

This invention relates to the production of solid calcium chloride or similar crystallizable material in the form of shaped masses, such as lumps, rods and the like, of uniform composition, structure and density, and to the process and apparatus by which such novel product is produced. In certain fields of use, and more particularly for the drying of air and gases, this type of structure and form of calcium chloride is advantageous.

The important features of the apparatus herein disclosed, and certain improvements on the specific form here illustrated, are claimed in our copending application Serial No. 223,044, filed August 4, 1938.

When molten calcium chloride is flowed into pans and cooled to room temperature to solidify, slabs of extreme hardness are formed which, when broken or crushed for the purpose of producing lumps, results in the production of a large amount of fine material which is wasted or has to be reworked. Calcium chloride in humid atmospheres, either in the form of slabs or while crushing them and handling the product, becomes moist, resulting in operating difficulties. When wet lumps of calcium chloride are stored in containers, they will become cemented together at the contact surfaces causing trouble in subsequent handling. The lumps produced not only vary in size which depends upon the screening care employed, but the shapes of lumps of approximately equivalent sizes also vary greatly and present sharp jagged edges and corners. These corners may be broken off in handling and transit producing chips and fines which are objectionable for air conditioning purposes. If shipped in waterproof bags, the bags are often punctured by the sharp protuberances. In order to obviate these difficulties, numerous attempts have been made to perfect the casting of molten calcium chloride in molds. When molten calcium chloride is poured into individual molds of the size and shape of the lumps or forms desired, it is a difficult matter to fill each mold and yet leave no excess that has to be recovered and reworked. Difficulty is also encountered in removing the lumps from the molds and in keeping the walls of the molds free of adhering calcium chloride which interferes with subsequent molding. These various difficulties involve excessive labor costs and prohibitive investment in molds and accessory equipment. The castings produced in this way often contain shrinkage cavities and whether made in individual molds or cast in slabs which are later crushed to form lumps, the crystalline structure composition and density may vary considerably. These variations may occur not only within a lump but also when comparing one lump with another.

The present invention has for an object the overcoming of these difficulties and the production of dense, non-porous lumps of hydrated calcium chloride of the desired shape and size and of a uniform crystalline structure and composition throughout the individual lumps and also in the different lumps.

Another object of the invention is the provision of a process for producing such lumps in a continuous and substantially automatic manner at low investment and labor costs, which process produces a minimum percentage of fines which are automatically separated from the lumps during the process. The lumps are delivered to receiving or shipping containers in dry form and will not cake together during storage and they exhibit superior resistance to degradation during shipment and handling. The various characteristics cited above make lumps of calcium chloride produced by this process especially suitable for drying air and other suitable gases.

Other objects and advantages of the invention will be apparent as this description proceeds.

In order to describe more fully the process of manufacture and the influence of the same upon the form and structure of the product, we give below a detailed description of one form of apparatus which has been operated successfully for this purpose, but it is to be understood that having disclosed the principles of the invention, it may be carried out in various types of apparatus and we do not intend to be limited by the specific embodiment described.

In the accompanying drawings:

Figure 1 is a part diagrammatic plan view showing one embodiment of apparatus suitable for accomplishing the objects of our invention;

Figure 2 is a view in side elevation of the apparatus of Figure 1 showing the means for driving the pump and the agitator for keeping the material in motion in the cooling conduit and preventing congelation or the formation of large crystals therein;

Figure 3 is a view partly in section through the reservoir and the cooling tube taken substantially on the line 3—3 of Figure 1;

Figure 3a is a part sectional view through the cooling tube showing the movement of the agitator therein whereby the walls of the tube and the agitator are kept free of built up adherent masses;

Figure 4 is a sectional view through the cooling tube and jacket taken on the line 4—4 of Figure 3;

Figure 5 is a longitudinal sectional view of the conveying belt and associated mechanism taken substantially on the line 5—5 of Figure 1;

Figure 6 is a sectional detail view showing the arrangement of the extruding nozzle, the conveying belt, the forming trough and the cutter wheel taken on the same plane as Figure 5;

Figures 7, 8 and 9 are sectional detail views through one form of conveying belt and associated parts taken respectively on the lines 7—7, 8—8, and 9—9 of Figure 5;

Figure 10 is a detail view in side elevation showing the take-up or tensioning device for tensioning the conveying belt;

Figure 11 is a view partly in section and partly in elevation of a second conveyor belt with blower devices and associated mechanism taken substantially on the line 11—11 of Figure 1;

Figure 12 is a detail plan view showing the arrangement for driving the blower and conveyor belts;

Figure 13 is a view in elevation taken from the right of Figure 11;

Figure 14 is an enlarged view of the cut made by the blades 61 in the material showing the characteristics of the cut made by a cutting wheel such as 62.

In the embodiment of apparatus shown in the drawings, calcium chloride is maintained as a concentrated hot solution in a reservoir 5, by a series of burners 6, supplied with gas through a pipe 7. The level of the liquid in reservoir 5 is preferably kept approximately constant by feeding into it intermittently or continuously calcium chloride solution of the proper strength. The reservoir is double-walled, as indicated at 8, and the combustion gases from the burners pass upwardly through the jacket thus formed to gas vents 9, at the top of the tank where they may be taken off through a suitable flue, not shown. A screen 10 of fine wire mesh serving to remove adventitious matter, separates the reservoir into two compartments, and the liquid material is introduced into one compartment and flows through this screen as it passes into the compartment 11, whence it is pumped by the gear or other suitable pump 12 through the conduit 16 to the cooling tube or conduit 15, and forming or extrusion nozzle 55. A release valve 18 is provided so that if plugging should take place in the tube or conduit 15, or the extrusion nozzle 55, the solution will be discharged into the reservoir and not injure the pump. The reservoir is provided with an outlet 19 for the purpose of draining the same.

The tube or conduit 15 is shown as passing horizontally through the reservoir 5, and is provided with a jacket 20 beyond the reservoir in which oil preferably is used to cool the calcium chloride to the point of crystallization and to remove the heat liberated by the crystallization during normal operation. The cooling oil preferably flows constantly through the jacket from the inlet 21 to the outlet 22, the flow and temperature of the oil being adjusted to maintain the desired conditions in the conduit. In starting operation of the apparatus, assuming that the tube 15 is empty, the oil is preferably heated by an outside means (not shown) to prevent solidification of the calcium chloride in the conduit 15. If the tube 15 contains solidified material from a previous run, the circulating oil is heated to a still higher temperature in order to convert the solid to a mushy consistency. During the operation, the oil is cooled by outside means (not shown) to remove the heat it has absorbed. The oil jacket is preferably insulated as indicated at 23.

In actual operation, a cooling tube 15 of 1½" inside diameter and 8 feet long has been employed, and has operated satisfactorily at a rate of production of 800 pounds per hour with oil entering the inlet 21 at about 30° C. and leaving outlet 22 at about 53° C. We do not however intend to be limited by these specific proportions, rates or temperatures since others can be selected in which the relations of available cooling surfaces, rate of operation and cooling oil temperature differentials are so balanced as to remove the necessary amount of heat of crystallization during the passage of the material through the tube without departing from the spirit and scope of the invention.

In order to prevent solids from building up on the walls of the conduit 15, which would ultimately stop further flow therethrough, the material crystallizing in the conduit is constantly swept or removed from the walls thereof by means of a suitably formed rotating agitator rod 25 which is moved back and forth to sweep all portions of the wall of the conduit as illustrated in Figure 3a. In Figures 3, 3a, and 4, this rod is shown as of zigzag shape throughout its stirring portion and is provided with a straight outer end whereby the rod may be caused to rotate within the conduit and to reciprocate longitudinally thereof through a stuffing box 26. The humps 25a of the agitator rod contact with the inside wall of the tube 15 and due to the rotation of the rod and its longitudinal movement, prevent calcium chloride from building up on the wall.

The pump 12 and agitator rod 25 are driven from a motor 28 through gearing best shown in Figures 1, 2 and 3. The motor carries on its main shaft an expansible pulley 29 for the purposes of varying the speed of the drive, the motor being movable on its base as indicated at 30 to maintain tension of the belt 31, as the effective size of the pulley is varied. A horizontal shaft 32 is driven through the pulley 33 by the belt 31. The driving connections to the pump, as best shown in Figures 1 and 2, comprise a shaft 35 connected to the shaft 32 by beveled gears, an aligned shaft 36 connected by a clutch 37 and a vertical shaft 39 driven from the shaft 36 by beveled gears. The pump is indicated as of gear type but may be of any suitable type.

Aligned with the shaft 32 is a shaft 40, the two shafts being connected by a clutch 41. The shaft 40 carries two sheaves 43 and 44, which serve as part of the belt drive for the agitator rod. As shown, a sheave 45 is connected by a belt 46 with the sheave 44 to rotate the agitator rod at a rate for example of the order of 200 R. P. M. The rod 25 is also reciprocated by means of gearing comprising a belt from the sheave 43 to a sheave 47 on a worm shaft 48, which in turn drives a worm wheel carrying a crank 50. A pivoted swinging arm 51 actuated by the crank 50 engages at its upper end and reciprocates the rod 25 at a rate for example of the order of 8 reciprocations per minute. The amount of longitudinal movement is greater than one half the distance between the humps 25a, as indicated by the dotted line position of Figure 3a, so that all portions of the wall of the tube 15 are swept by the humps of the agitator 25 to keep the walls of the tube free of adhering masses. A clean wall providing rapid heat transfer is essential from the standpoint of high capacity of the apparatus and has a beneficial effect upon the process and the structure of the product as described later. The movement of the agitator rod 25 back and forh and its simultaneous rotation prevents the adherence of solid masses to the rod itself. In this manner the material in the conduit 15 is never permitted to become quiescent and adherence of solidified material to the walls of the conduit or to the agitator rod is prevented. It is of prime importance that the calcium chloride shall not be permitted to build up on the walls of the tube 15 or the rod 25 or other agitator for once it has started it very quickly clogs the entire tube and prevents further flow therethrough.

While this agitation within and cleaning of the walls of the conduit 15 may be accomplished in other ways than that specifically shown, we have found that the form of agitation shown will keep all of the material within the conduit 15 in turbulent motion so that the apparatus shown can be run indefinitely without clogging or solidification within the tube 15.

It should also be noted that the crystallization is caused to take place in a closed conduit, since if water is permitted to evaporate, even to only a small percentage during this step, the solidification temperature of the mass increases very rapidly which would cause a shut-down of the process. The mush discharged from the nozzle 55 is substantially the same ultimate analysis as the hot solution of calcium chloride supplied to the cooling conduit by the pump.

Suitable insulation is provided around the conduit 15 in the heating jacket of the tank, as indicated at 53, to prevent excessive heat being applied to the conduit at this point.

As the material passes from the pump through the conduit 15 to the nozzle 55 which is covered with insulation as indicated in Figures 5 and 6 to prevent too rapid cooling or congelation of the material therein, the material is cooled from a liquid to a mushy-crystalline condition in which the crystals are kept in motion and prevented from cementing together by the agitator 25 and in this state it is extruded onto a conveying belt 56 carried by the pulleys 57 and 58 and passing at the nozzle position and beyond the same through a forming trough 60 which folds the belt into a trough or U-shape and of a transverse diameter not greatly different from the diameter of the nozzle. At this point, the material may be sufficiently soft so that if not so retained by the U-shaped forming belt, it would flatten out unduly.

On the belt 56 the material is quickly cooled at least on its exterior surface as, for example, by a current of air or otherwise, as by chilling of the forming belt, and as it is discharged near its congelation point becomes correspondingly more firm. As the material on the belt passes through the forming trough 60, it is separated into short lengths by blades 61 on a wheel 62 which wheel may be driven only by its engagement with the material and the belt 56 although if rods of substantial length are desired, it is preferable to gear the wheel 62 to the belt 56 so that it may be positively driven. The forming trough 60 is of sufficient length as compared with the rapidity of cooling so that the mush will harden to the proper consistency for cutting and so that the separated lengths of material 64 after being cut will not unduly lose their shape. As the blades 61 are cooled by the air, they exert a chilling influence on the cut ends of the material. The blades 61 as shown in the drawings produce a cut in the mush which may be shaped substantially as shown by the enlarged scale of Figure 14. This cut may be of considerable width, especially at the top, thereby acting to preclude healing together of the freshly cut surfaces after the cut is made. This type of cut is moreover easily cooled by air currents which cause a hardened skin to form thereon further preventing any tendency to re-heal. The peculiar wiping action of the surfaces of the blades 61 upon the cut surfaces minimizes any tendency for material to adhere thereto. Infrequently, a small fragment will attach itself to a blade but in passing around the wheel, it cools considerably and the next time that the blade enters the mush, the fragment is detached therefrom, is embedded in the hot mush and becomes a part of its structure. The construction and operation of this type of cutter eliminate the necessity for providing accessories for cleaning the blades.

After the material has been cut by the blades 61 while it is supported in the forming trough, the belt conveyor starts to flatten out, thereby separating itself from the sides of the cut lumps. The flattened belt 56 then passes around the small pulleys 65 and 66 in such an arrangement that the lengths or lumps 64 will turn through a 90° angle and drop on one end onto the belt at a lower level. This accomplishes a complete separation of the successive lengths and also turns the lengths thus giving a better exposure to the cooling air. It is somewhat preferable that the arrangement of parts be such that the several lengths will stand on end after tumbling over the pulley 65, thereby reducing the tendency to roll. It has also been found that they retain their individual lengths and hold their shape better when standing on end rather than when lying on their sides. We may use a pusher 67 positioned to engage and bear down upon the lengths of severed material as they pass beyond the point of support by the pulley 65 to insure a severance from the preceding length in the event there is any adherence.

Figure 7 shows how the belt 56 is gathered up into a U form by the trough 60 with the mush in position in the U-shaped belt as it leaves the extrusion nozzle 55.

Figure 8 shows how the belt in U form supports the mush during the time that a blade 61 is cutting the material into fixed lengths.

Figure 9 shows a cut lump lying on the flattened belt just prior to being tumbled over the pulley 65. By this means the belt changes gradually from the U form at Figure 8 to the flat form at Figure 9 during which movement the belt is disengaged from the side surfaces of the lumps.

As shown in Figure 10, one or both of the pulleys 65 and 66 are adjustably mounted to provide for tensioning of the belt 56. As shown, one end of the pulley shaft is mounted in movable journals, the position of which may be adjusted by the adjustable screw and nut devices 70 and 71. A suitable casing 73 encloses the belt 56 and associate parts, and beyond the wheel 62 this casing is provided with a hinged cover 74 to confine the belt 56 to a closed tunnel through which the lumps 64 are conveyed while air is being blown through the tunnel to further cool the lumps. Any suitable belt may be used but we have successfully employed a rubber impregnated fabric belt. After further cooling on the belt, the formed lumps of material are discharged from the belt 56 over a guide plate 76 to a second conveyor belt, which conveniently may be a wire mesh belt 75 to permit better circulation of air around the material thereon as best shown in Figures 11 to 13. The conveyor belt 75 carries the material forward through a casing 77 through which air is also circulated to further cool and condition the material so that the lumps are strong enough to stand handling and storage. The casing 77 is shown as provided with a hinged cover 78 to facilitate inspection and adjustment. The tension of the belt 75 may be maintained by suitable adjusting devices such as indicated at 79.

The belts 56 and 75 are preferably driven from a single motor 80 by suitable gearing. Inasmuch as the belt 56 should be driven in suitably timed relation to the drive of the pump 12, speed adjusting means is provided between the motor 80 and the drive of the belt 56. As shown, an expansible pulley 82 is provided on the motor shaft and the motor is mounted for transverse adjustment whereby the speed of the belt may be changed. A worm shaft 85 is driven by a belt 86 from the pulley 82 and in turn drives a worm wheel on the shaft 88. Sprocket wheels 89 and 90 and a chain connect the shaft 88 with the shaft 92 which carries the pulley 58. The shaft 88 also drives a shaft 95 through beveled gears 96 and this shaft in turn through sprocket wheels 99 and 100, and a chain 101 drives the shaft 102 which carries the belt 75 and drives it.

Air is supplied to the casings enclosing the belts 56 and 75 by suitable means such, for example, as a blower 105. As shown, this blower is mounted on the same base as the motor 80 and directly connected thereto. A flexible sleeve 106 of canvas or other suitable material connects the blower and the casings. The discharge from the blower is preferably divided to provide a current of air passing through an upper passageway 107 and into the casing 73 and a lower passageway 108 to provide a current of air passing into the casing 77.

The belt 75 is preferably supported on a number of intermediate pulleys 110 and if desired this belt may be arranged on an incline to carry the material to a higher level where it may be discharged into bins or bags. Any fine particles of solid calcium chloride which fall through the meshes of the belt 75 drop to the lower wall of the casing 77 and are removed by the operation of the belt 75 through the chute 116 into the box 117.

At the discharge end of this conveyor a grid 112 is provided over which the material tumbles and through which any remaining fines are discharged into the box 118 before the material passes into a receptacle such as a bag conventionally indicated at 115.

If desired, separate blowers may be provided for supplying air to the casing surrounding the wire mesh conveyor belt 75 and to the casing 73. In that event heated air may be supplied to either casing or preferably to the casing surrounding the wire mesh conveyor belt 75 to evaporate further water from the lumps and increase the calcium chloride content or the lumps discharged at the point 112 may be heated in suitable apparatus for this purpose.

When operating in accordance with the invention, a calcium chloride solution which has been brought to the required condition as regards water content, which may be for example 28% water or within the range 26 to 30% is contained in the reservoir 5 at a suitable temperature which may be 172° C. or for example within the range 163° C. to 175° C. Oil or other suitable fluid preheated to a temperature of about 140° C. is circulated through the jacket 20. The agitator 25 is set in motion and the pump 12 is started. The calcium chloride solution passing through the conduit 15 is converted into a mushy consistency by the separation of very fine crystals of hydrated calcium chloride. At the start this mush is purposely made more fluid than when under operating conditions and for that reason the nozzle 55 is preferably pivoted on the end of the conduit 15 so that it can be turned down to the dotted line position shown in Figure 5 to discharge the mush into bucket 55a. The oil temperature is then reduced and the pumping rate adjusted so that the mush is at the proper consistency for cutting into lumps. The nozzle 55 is then swung back into its operating position and the speed of the conveyor belt adjusted so that it carries the output of the nozzle 55 away at the rate it is delivered. As long as the pump 12 runs at a constant rate and the reservoir 5 is supplied with calcium chloride solution of the proper strength, preferably at a reasonably constant level in the reservoir 5, the rate of delivery of the pump is constant. From this standpoint the pump acts primarily as a constant feeding device.

Due to the fact that the majority of the heat removed in the tube 15 is latent heat of crystallization, the actual drop in temperature through the tube is ordinarily only from about 172° C. to about 162° C. The material is held in the conveying belt, cut and cooled as described above. The lumps are further cooled during their passage through the belt conveying system by blowing air into contact with them. Due to the fact that the lumps are still hot when they discharge into the receiver 115, they do not deliquesce even if the air is humid. If necessary, pre-dried air may be used for the purpose. Despite the fact that the lumps are hot when they enter the receiver 115, they have been cooled sufficiently so that they do not deform therein. They may, however, still contain a certain proportion of uncrystallized solution as is evidenced by the fact that they continue to liberate some heat over a period of hours during which time they continue to increase in strength. When finally cool, they are extremely hard, dense and of uniform structure and composition.

The small amount of chips and fines formed in the process and the forerunnings in bucket 55a may be returned to the reservoir 5. Due to the efficiency of forming and cutting the lumps, the apparatus as shown in the drawings has continuously produced a yield of lumps satisfactory for conditioning air, better than 99% of the calcium chloride solution pumped.

Our experience has shown that there are certain fundamental process principles that must be adhered to in order to devise a suitable apparatus for economical production of calcium chloride in lump form and for the production of lumps possessing the desirable characteristics described above. The mush discharged from nozzle 55 must be of proper consistency and this we have provided by rapid crystallization whereby a considerable part of hydrated calcium chloride is present in the form of fine crystals presenting in the aggregate a very great surface area and the remaining hydrated calcium chloride which is still liquid then cooperates to produce a smooth mush of uniform texture. To produce these crystals in finely divided form, rapid heat removal is required and therefore the heat removing surface must be kept clean and the agitated mass must be in a turbulent condition. To insure turbulence of the mass, the type of agitator used must be such that it cuts through the mass without any substantial building up of material upon its structure. The rate of flow of the material through this crystallizing stage should be steady, hence the agitator should not impede or accelerate this rate. These requirements are solved in a simple manner by the double acting agitator as shown in Figures 3 and 3a. It keeps the heat absorbing surface clean and, despite the fact that it is oscillated longitudinally for this purpose and to keep its own surfaces clean, it sets up substantially no positive or negative influence upon the flow rate as controlled by the pump. In addition to the fineness of crystal size in the mush, another important function of the agitated tube is to remove as much heat as possible and crystallize as large a percentage of material as possible because the material in quiescent form, for example as a lump, cools only very slowly. Hence the mush being extruded from the nozzle 55 should be as stiff as possible but allowing a safe margin so that the tube will not be plugged solid. Removing the maximum of heat in the tube 15 without departing from the determined and stated requirements permits a large output with inexpensive equipment.

The character of the mush as it reaches the end of the conduit 15 and is discharged through the nozzle 55 affects the way it handles on the belt. A fine grained mush cuts cleaner as compared to an agglomerate of large crystals. If it is of the proper consistency, it holds its shape immediately after cutting and the supporting belt may be peeled away immediately thereafter. This exposure of the surfaces permits cooling by air in a simple and rapid manner. The lumps are cooled by this means to a condition where they will stand handling but are still hot enough not to deliquesce.

By this process a new type of formed calcium chloride is produced containing no shrinkage cavities, or pipes, possessing improved strength and having a structure composed of very fine crystals of substantially uniform size both on the surface of the lump and throughout its mass, said fine crystals being cemented together into a dense and non-porous body. Such product is claimed in our copending application, Serial No. 220,344, filed July 20, 1938. This process furthermore produces calcium chloride in the form of lumps of substantially uniform size and shape which when discharged therefrom into sealed containers do not become cemented together during storage.

When solid deodorizing agents possessing a very fine particle size are to be incorporated into the lumps as described in Patent 2,027,093 of Charles R. Downs, granted on copending application Ser. No. 698,123, filed November 15, 1933, these deodorizing agents are intimately mixed with the hydrated calcium chloride and are not segregated in the formed lumps.

We have shown a pump as a constant and adjustable feeding device to supply the liquid to the cooling conduit but hydrostatic or other sources of pressure may be used combined with suitable flow control to regulate the rate of flow through conduit 15. It should be noted that in the arrangement as shown, the speed of agitation varies as the speed of the pump, so that as the flow increases, the agitation is increased and vice versa.

We have shown and described an apparatus possessing a single extrusion nozzle of circular cross section but multiple nozzles or other shapes may be used for the purpose. The belt 56 may be flat as the mush is discharged onto it, thereby permitting a ribbon to be formed thereon.

We have shown and described a process and apparatus in which a mush of crystals of the material is continuously formed and continuously withdrawn and cut into shapes on a moving belt. It will be understood, however, that instead of forming into lumps as specifically described, the mush of crystals may be flowed into molds (in which upon solidification it adheres less tenaciously to the walls than when the molds are filled with molten material), or it may be filled into the cavities of briquetting rolls, and that various other modifications and changes may be made in the specific apparatus shown without departing from the spirit of our invention or the scope of the appended claims. The mush may moreover be filled into metallic shipping drums and in that condition is superior to molten calcium chloride in that it then can be moved and handled with less danger of slopping over.

While we have described our invention specifically to calcium chloride, other materials of comparable physical properties may be formed into shapes and packaged in the same way.

We claim:

1. The method of forming hydrated calcium chloride into solid lumps of uniform consistency, which comprises flowing molten hydrated calcium chloride through a cooling conduit, cooling the material to a point of partial crystallization in the cooling conduit, constantly scraping solidified crystals from the walls of the cooling conduit and mixing them with the material within the conduit, discharging the partially crystallized material in a mushy state of such consistency that it can be divided into individual formed masses, shaping the discharged material into the desired masses and completing the solidification of the material in its shaped condition.

2. The process of forming crystalline solid hydrated calcium chloride into shaped masses, comprising providing the material in molten condition, agitating the molten material while forcing it through a passage comprising heat absorbing surfaces at such a rate that formation of fine crystals results, due to rapid removal of latent heat from the molten material, extruding the crystal containing material as a semi-plastic stream, dividing said stream into shaped masses by cooled dividing surfaces, and further cooling the material to further crystallize and harden the product.

3. The method of forming hydrated calcium chloride into solid lumps which comprises preparing a hot solution of calcium chloride containing 26% to 30% of water and capable of solidifying when cooled, pumping the solution through a cooling conduit and extruding it therefrom, maintaining the material in constant agitation during its passage through the conduit, cooling the material during its passage through the conduit to a mush-like crystalline suspension, separating the material upon extrusion from the conduit into predetermined masses, and further cooling the masses to solid crystalline lumps.

4. The method of forming hydrated calcium chloride into solid lumps which comprises preparing a calcium chloride solution of approximately 28% water content at a temperature of approximately 170° C., pumping the material through a cooling conduit and extruding it therefrom, maintaining the material under constant agitation in the cooling conduit, cooling the material during its passage through the conduit to a temperature of approximately 160° C. whereby to obtain a crystalline mush capable of being divided into individual formed masses, dividing the extruded material into formed masses, separating the masses and further cooling to prevent the deformation of the separate masses.

5. The method of forming deodorized hydrated calcium chloride into solid lumps which comprises preparing a calcium chloride solution of approximately 28% water content at a temperature of approximately 170° C., adding a finely divided deodorizing constituent thereto, pumping the material through a cooling conduit and extruding it therefrom, maintaining the material under constant agitation in the cooling conduit, cooling the material during its passage through the conduit to a temperature of approximately 160° C. whereby to obtain a crystalline mush capable of being divided into individual formed masses, dividing the extruded material into formed masses, separating the masses and further cooling to prevent the deformation of the separate masses.

6. The method of producing non-porous shaped masses of hydrated calcium chloride which comprises forming a supply of concentrated hot calcium chloride solution capable of solidifying when cooled, forcing a stream of the material from said supply to a cooling zone, removing heat from said stream and simultaneously agitating the same during passage through said zone to form a uniform distribution of small crystals therein and to convert the material in the stream to a mushy crystalline state capable of being divided into individual formed masses, shaping the mushy crystalline material from said stream into separate masses and further cooling and solidifying said masses.

7. The method of forming solid hydrated calcium chloride lumps of uniform consistency and substantially uniform size and shape from molten hydrated calcium chloride, said method comprising flowing the molten material through a conduit and simultaneously agitating the material and cooling it to such an extent as to effect partial crystallization and give it a mushy consistency, forming the mushy material into masses of the desired size and shape, and further cooling said masses to solidify the previously unsolidified calcium chloride hydrate and thereby form a matrix cementing said crystals together.

8. The method of forming hydrated calcium chloride into solid odorless lumps which comprises preparing a hot solution of calcium chloride containing 26% to 30% of water and capable of solidifying when cooled, suspending finely divided activated carbon therein, pumping the suspension through a cooling conduit and discharging it therefrom, maintaining the material in constant agitation during its passage through the conduit, cooling the material during its passage through the conduit to a substantially uniform crystalline suspension, separating the material upon discharge from the conduit into predetermined masses, and further cooling the masses to solid crystalline lumps.

CHARLES R. DOWNS.
JOSEPH W. SPISELMAN.